US009005495B2

United States Patent
Wang et al.

(10) Patent No.: US 9,005,495 B2
(45) Date of Patent: Apr. 14, 2015

(54) SYSTEM AND METHOD FOR RAPIDLY HEATING AND COOLING A MOLD

(75) Inventors: Zhong Wang, Zhu Hai (CN); Charles R. Hill, Loudonville, OH (US)

(73) Assignee: Flextronics AP, LLC, Broomfield, CO (US)

( * ) Notice: Subject to any disclaimer, the term of this patent is extended or adjusted under 35 U.S.C. 154(b) by 703 days.

(21) Appl. No.: 12/589,123

(22) Filed: Oct. 16, 2009

(65) Prior Publication Data

US 2010/0187709 A1 Jul. 29, 2010

Related U.S. Application Data

(60) Provisional application No. 61/274,048, filed on Aug. 12, 2009.

(30) Foreign Application Priority Data

Oct. 16, 2008 (CN) .................. 2008 2 0202111 U

(51) Int. Cl.
*B29C 45/73* (2006.01)
*B29C 35/00* (2006.01)
*B29C 35/04* (2006.01)

(52) U.S. Cl.
CPC .......... *B29C 35/007* (2013.01); *B29C 35/049* (2013.01); *B29C 45/7306* (2013.01)

(58) Field of Classification Search
USPC ........................................ 264/40.6; 425/144
See application file for complete search history.

(56) References Cited

U.S. PATENT DOCUMENTS 2,357,706 A * 9/1944 Toepperwein ................ 165/265
2,632,088 A   3/1953 Meyrick et al.
(Continued)

FOREIGN PATENT DOCUMENTS

DE   2802335 A1   12/1979
GB   1422109   *   1/1976

OTHER PUBLICATIONS

*Iceman Full Range Temperature Control System*; Mokon—Circulating Liquid Temperature Control Systems; Buffalo, NY; http://www.mokon.com/starpage.asp?cat=3&parent=12&prodid=12, Sep. 28, 2009.

(Continued)

*Primary Examiner* — Jill Heitbrink
(74) *Attorney, Agent, or Firm* — Haverstock & Owens LLP

(57) ABSTRACT

A portable mold-temperature control unit includes a local heating system, a first fluid duct, a second fluid duct, and a fluid exchange system. The local heating system includes a local heater for heating fluid that is used to rapidly heat a mold. The first fluid duct carries hot fluid heated by the local heating system. The second fluid duct carries cool fluid that is used to rapidly cool a mold. The fluid exchange system includes an outlet that permits fluid to flow from the first and second fluid ducts to the mold during heating and cooling, respectively. The fluid exchange system also includes an inlet that receives the fluid as it returns from the mold. In one embodiment, the heating system reheats the fluid returning from the mold and reuses it to heat the mold again. In a more particular embodiment, the heating system includes a steam generator that generates steam used to heat the mold. In another embodiment, the portable mold-temperature control system includes a local cooling system that cools the fluid used to cool the mold. In a more particular embodiment, the local cooling system cools fluid returning from the mold and reuses it to cool the mold. A method for using the portable mold-temperature control unit is also disclosed.

33 Claims, 8 Drawing Sheets

(56) References Cited

U.S. PATENT DOCUMENTS

| | | | |
|---|---|---|---|
| 3,259,175 A | 7/1966 | Kraus et al. | |
| 3,378,245 A * | 4/1968 | Frank | 425/4 R |
| 3,847,209 A | 11/1974 | Mascall | |
| 4,026,299 A | 5/1977 | Sauder | |
| 4,251,479 A * | 2/1981 | Pecht et al. | 264/106 |
| 4,373,574 A * | 2/1983 | Schafer | 165/236 |
| 4,680,001 A | 7/1987 | Waters | |
| 5,376,317 A | 12/1994 | Maus et al. | |
| 5,427,720 A | 6/1995 | Kotzab | |
| 5,591,220 A | 1/1997 | Mahawili | |
| 5,776,514 A * | 7/1998 | Wu et al. | 425/144 |
| 5,946,925 A | 9/1999 | Williams et al. | |
| 6,290,882 B1 | 9/2001 | Maus et al. | |
| 6,312,628 B1 | 11/2001 | Wieder et al. | |
| 6,322,343 B1 * | 11/2001 | Yoda et al. | 425/62 |
| 6,499,535 B2 * | 12/2002 | Cowans | 165/206 |
| 6,775,996 B2 * | 8/2004 | Cowans | 62/160 |
| 6,991,756 B2 | 1/2006 | Saeki et al. | |
| 7,290,587 B2 | 11/2007 | Ward | |
| 7,323,127 B2 | 1/2008 | Muranaka et al. | |
| 2004/0188886 A1 | 9/2004 | Yamashita et al. | |
| 2005/0150635 A1 | 7/2005 | Luebke | |
| 2006/0196957 A1 | 9/2006 | Johnson | |
| 2007/0034352 A1 | 2/2007 | Lee | |
| 2007/0063061 A1 * | 3/2007 | Nagasaka | 236/68 B |
| 2007/0158056 A1 | 7/2007 | Dickinson et al. | |
| 2008/0111280 A1 | 5/2008 | Choe et al. | |

OTHER PUBLICATIONS

*Mokon's Iceman Full Range Temperature Control System Offers Heating and Chilling in One Package*; ThomasNet News; http://news.thomasnet.com/fullstory/516019, Sep. 27, 2009.

*Temperature Conditioning System With 3 Way Valve*; Doc# Temperature3wayvalve, Rev. A; Ingersoll Rand Industrial Technologies, © Dec. 2005.

*Regloplas Temperature Control Units*; hhtp://www.regloplasusa.com/, Sep. 25, 2009.

PCT Application No. PCT/US2009/005653, International Search Report and Written Opinion dated Dec. 10, 2009.

* cited by examiner

SYSTEM AND METHOD FOR RAPIDLY HEATING AND COOLING A MOLD

RELATED APPLICATIONS

This application claims the benefit of U.S. Provisional Patent Application No. 61/274,048, filed Aug. 12, 2009 by the same inventors, which is incorporated herein by reference in its entirety. This application also claims the benefit of foreign priority to Chinese Application No. 200820202111.0, filed Oct. 16, 2008 by at least one common inventor, which is also incorporated herein by reference in its entirety.

BACKGROUND OF THE INVENTION

1. Field of the Invention

This invention relates generally to heat exchange systems, and more particularly to a method and device for controlling the temperature of molds. Even more particularly, the invention relates to a device and method for rapidly heating and cooling a mold during a molding process.

2. Description of the Background Art

In the manufacturing industry, injection molding is a common process for producing parts. Conventional injection molding requires the use of a constant-temperature mold, an injection molding machine, and raw plastic material. The mold includes a core side and a cavity side which, together, define the shape of a part or multiple parts being molded. The injection molding machine is responsible for heating the raw plastic material until liquefied, then injecting the molten plastic into the mold.

The conventional injection molding process includes a clamping stage, an injection stage, a cooling stage, and a removal stage. In the clamping stage, the core side and cavity side are clamped shut while the raw plastic is being melted within the injection mold machine. Then, in the injection stage, the molten plastic is injected and packed into the cavity of the mold. In the cooling stage, the mold remains clamped while the molten plastic cools and solidifies into the final part. Finally, in the removal stage, the mold is unclamped and the newly formed part is removed via, for example, an ejector pin. After the part is ejected, the cycle is typically repeated.

There are several well known problems that limit the use of constant-temperature injection molding. For example, the surface finish and structural integrity of the final part is substantially compromised when a known problem called "premature freezing" occurs. Premature freezing occurs during the injection stage when the temperature of the mold is less than the temperature of the molten plastic. As the molten plastic contacts the cooler interior wall of the mold, freezing of the plastic begins at the plastic-to-mold interface before the entire shot of molten plastic is injected and packed into the mold. This is particularly undesirable when molding long and thin parts, optical parts, and parts that require a glossy surface finish. Further, uneven solidification is another known problem that can result from premature freezing or when the molten plastic is cooled too slowly. If the molten part is cooled too slowly, certain areas of the molten plastic freeze and, therefore, shrink before other areas. Of course, if this occurs, the final part will likely include several defects (e.g., dimensional distortion, knit lines, poor surface finish, etc.).

It is known that these problems can be avoided by controlling the temperature of the mold itself during the molding process. In particular, premature freezing is avoided by heating the mold above the plastics heat distortion temperature (HDT) before the molten plastic is injected. Once the molten plastic is injected into the hot mold and allowed to set, the mold is cooled to minimize uneven solidification. Heating the mold is typically done by pumping hot fluid through a tunnel, or network of tunnels, formed in the mold. Likewise, cooling is done by pumping cool fluid through a separate tunnel, or network of tunnels, formed in the mold.

Current molding facilities typically employ a remote boiler system and a remote cooling reservoir, both of which supply fluid to multiple molds located throughout the facility. The molds are connected to the boiler via hot fluid supply lines that carry hot fluid to each of the molds. The molds are also connected to the cooling reservoir via cool fluid supply lines that carry cool fluid to each of the molds. After fluid is passed through the molds, it can be carried back to either the boiler or the cooling reservoir through fluid return lines. Fluid carried back to the boiler is reheated and used again while fluid carried back to the cooling reservoir is cooled and used again.

Although current molding facilities can control the temperature of multiple molds, there are several disadvantages. For example, the initial cost and development of such facilities is very high. As another example, daily production costs in current facilities are also high. Much of these production costs are a result of high daily energy and maintenance costs. Daily energy costs are high primarily because boiler systems and cooling systems consume a great deal of energy during operation. Additionally, thermal energy dissipates through the fluid lines and is, therefore, lost as fluid is moved long distances to and from the molds. Maintenance costs are high as a result of preventative maintenance that is required to prevent downtime of the boiler system and/or cooling system during production because downtime of the boiler system and/or cooling system likely results in downtime of the entire facility. As another example, it is difficult to move or relocate molding equipment throughout such facilities because heating and cooling of the molds can only be done in locations that provide access to the fluid supply and return lines.

What is needed, therefore, is a mold-temperature control system that is less expensive. What is also needed is a more energy-efficient mold-temperature system that requires less preventative maintenance during operation. What is also needed is a mold-temperature control system that can operate without being connected to a remote fluid source.

SUMMARY

The present invention overcomes the problems associated with the prior art by providing a self-contained, portable mold temperature control unit. The invention facilitates the controlled rapid heating and cooling of a mold during each cycle of a molding process. The unit is particularly useful to provide rapid heating and cooling of the mold in physical plants that lack infrastructure to distribute steam, hot liquids, cool liquids, or other means of controlling the temperature of a mold.

In an example embodiment, a portable mold-temperature control unit includes a support structure, a transport mechanism coupled to the support structure, a heating system coupled to the support structure for heating fluid used to heat a mold, a first fluid duct coupled to the support structure for facilitating the flow of hot fluid heated by the heating system, a second fluid duct coupled to the support structure for facilitating the flow of cool fluid used to cool the mold, and a fluid exchange system coupled to the support structure and operative to supply hot fluid from the first fluid duct to the mold and cool fluid from the second fluid duct to the mold. The fluid exchange system is also operative to receive the circulated fluid back from the mold.

The portable mold-temperature control unit optionally includes a cooling system coupled to the support structure.

The second fluid duct facilitates the flow of fluid cooled by the cooling system. An example cooling system includes a refrigeration system and a cool-fluid reservoir. The refrigeration system cools the fluid, and the cool-fluid reservoir holds the fluid cooled by the refrigeration system for circulation through the mold.

A portable mold-temperature control unit according to claim 2, wherein the fluid exchange system includes an inlet for receiving fluid from a remote fluid source. Using the inlet as a fluid source, the control unit can operate in at least two different ways. Operating in a first mode, the cooling unit receives the fluid from an external source, cools the fluid as it passes through the unit on the way to the mold, receives the fluid back from the mold, and discharges the fluid back to the original fluid source or to a drain. In a second mode of operation, the cooling system operatives as a closed system. The system is originally charged with fluid via the inlet from the external source. Then the unit is disconnected from the external source and connected to the mold. The unit then cools the fluid as it is repeatedly circulated through the mold.

In a particular embodiment, the heating system includes a heater operative to heat liquid used to heat the mold. In addition, the heating system includes an optional steam generator operative to generate steam, which can also be used to heat the mold. The first duct facilitates the flow of steam generated, by the steam generator to the mold, and a third duct facilitates the flow of the heated liquid to the mold. The fluid exchange system further includes an outlet operative to selectively supply fluid from the first fluid duct, the second fluid duct, and the third fluid duct to the mold. In addition, the fluid exchange system includes an inlet operative to receive the fluid supplied to the mold via the outlet back into the mold-temperature control unit. Because the heated fluid, the heated liquid and the cooled fluid all have the same composition (e.g., water), they can all pass through a single inlet and single outlet, without a problem of cross-contamination.

In a particular embodiment, the thermal regulating fluid is routed into and out of the mold temperature control unit and to and from the mold via a system of valves. The valve system includes a first valve capable of operating in at least a first position and a second position. The first valve includes a first inlet port coupled to receive hot fluid from at least one of the first fluid duct and the third fluid duct, a second inlet port coupled to receive cool fluid from the second duct, and an outlet port coupled to supply fluid to the outlet of the fluid exchange system. In the first position, the first inlet port is opened and the second inlet port is closed, thus passing hot fluid to the outlet of the fluid exchange system. In the second position, the first inlet port is closed and the second inlet port is opened, thus passing cool fluid to the outlet of the fluid exchange system.

The example fluid exchange system further includes a second outlet for circulating fluid from the mold-temperature control unit to a remote fluid reservoir. The valve system includes a second valve that is capable of operating in at least a first position and a second position. The second valve includes an inlet port coupled to receive fluid from the mold via the inlet of the fluid exchange system, a first outlet port coupled to at least one of the cooling system and the heating system, and a second outlet port coupled to route fluid to the second outlet. In the first position, the first outlet port is opened and the second outlet port is closed, thus routing the thermal regulating fluid back to the internal heating/cooling systems of the mold-temperature control unit. In the second position, the first outlet port is closed and the second outlet port is opened, thus routing the thermal regulating fluid to the remote fluid reservoir.

In another example embodiment, the fluid exchange system includes an outlet, an inlet, a second outlet, and a second inlet. The outlet is operative to supply the thermal regulating fluid from the first fluid duct and the second fluid duct to the mold, and the inlet is operative to receive the thermal regulating fluid returning from the mold. The second outlet is operative to discharge the fluid out of the mold-temperature control unit; and the second inlet is operative to receive fluid from a remote fluid source. A first valve, capable of operating in a first position and a second position, includes a first inlet port coupled to receive hot fluid from the first fluid duct, a second inlet port coupled to receive cool fluid from the second fluid duct, and an outlet port coupled to supply fluid to the outlet. When the first valve is in the first position, the first inlet port is opened and the second inlet is closed, thereby providing hot fluid to the outlet. When the first valve is in the second position, the first inlet port is closed and the second inlet port is opened, thereby providing cool fluid to the outlet.

A second valve, capable of operating in first position and a second position, includes a first inlet port coupled to receive fluid from the inlet, a first outlet port coupled to at least one of the cooling system and the heating system, and a second outlet port operative to route fluid to the second outlet. When the second valve operates in the first position, the first outlet port is opened and the second outlet port is closed, thereby routing the thermal regulating fluid to the internal heater system and/or cooling system. When the second valve is operating in the second position, the first outlet port is closed and the second outlet port is opened, thereby routing the thermal regulating fluid out of the mold-temperature control unit, via the second outlet, back to the remote fluid reservoir.

When the fluids of the same composition are used for both heating and cooling, the fluid handling system is simplified. For example, the outlet of the fluid exchange system can include a single outlet port coupled to permit fluid from both the first fluid duct and the second fluid duct to flow therethrough. Similarly, the inlet of the fluid exchange system can include a single inlet port that receives fluid supplied to the mold by both the first fluid duct (hot) and the second fluid duct (cold).

Optionally, the local heating system includes a local steam generator mounted to the portable support structure and operative to generate steam. The steam generated by the steam generator is directed to the mold via the first fluid duct. In addition, the heating system includes a reservoir operative to contain hot water. The reservoir is coupled to supply hot water to the steam generator.

As indicated above, the heating system includes a heater operative to heat liquid used to heat the mold. The first duct facilitates the flow of liquid heated by the heater to the mold. The fluid exchange system includes an inlet adapted to receive water from a remote water source and another inlet to receive return water from the mold. The local heating system is operative to heat water received via either inlet and route the heated water to the mold.

The mold-temperature control unit can advantageously use hot water under high pressure to heat the mold. In one embodiment, the control unit includes an air compressor coupled to the support structure for providing pressurized air to maintain the heated liquid under pressure. Alternatively, the control unit includes an air inlet adapted to receive pressurized air (or other pressurized gas) from a remote source. The pressurized air maintains the heated liquid under pressure and keeps the thermal regulating fluid in its liquid state, even at high temperatures.

The thermal regulating fluids are circulated through the portable mold-temperature control unit and the mold using a pump system coupled to the support structure. The pump system includes a hot-fluid pump and a cool-fluid pump. The hot-fluid pump is operative to transport hot fluid through the first fluid duct when actuated. The cool-fluid pump is operative to transport cool fluid through the second fluid duct when actuated. Optionally, the portable mold-temperature control unit includes a filter system to maintain the cleanliness of the thermal regulating fluid and avoid contamination of the pumps, the fluid channels in the mold, and so on. An example portable mold-temperature control further includes a control system coupled to the support structure. The control system includes a user input/output device, an interface for communicating with a mold machine, a set of electromechanical valves coupled to receive control signals provided by the control system and operative to selectively provide the hot fluid and the cool fluid to the mold based on the control signals, and a pump system coupled to receive control signals provided by the control system and operative to selectively pump the hot fluid and the cool fluid based on the control signals. The control system is adapted to receive electrical signals provided by a remote mold-temperature sensor and a local temperature sensor.

As indicated above, the portable mold-temperature control unit is self-contained. The unit includes a local heater, a local hot-water reservoir operative to contain water heated by the heater, a local refrigeration system, a local cool-water reservoir operative to hold water cooled by the local refrigeration system, a local steam generator operative to generate steam, a local pump system, and a local control system electrically coupled to the local pump system.

A method for controlling the temperature of a mold is also disclosed. The method includes providing a portable mold-temperature control unit, providing a remote fluid source, providing a mold, connecting the portable mold-temperature control unit to the remote fluid source, transferring fluid from the remote fluid source to the portable mold-temperature control unit, disconnecting the portable mold-temperature control unit from the remote fluid source, connecting the portable mold-temperature control unit to the mold, and circulating the fluid from the mold-temperature control unit through the mold while the portable mold-temperature control unit is disconnected from the remote fluid source.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a portable mold-temperature control unit that can operate with or without being connected to a remote fluid source. In the following description, numerous specific details are set forth (e.g., remote cooling tower, fluid valves, fluid-lines, fluid-line connectors, etc.) in order to provide a thorough understanding of the invention. Those skilled in the art will recognize, however, that the invention may be practiced apart from these specific details. In other instances, details of well known molding practices (e.g., heating/injection/packing, part ejection, plastic type, etc.) and components have been omitted, so as not to unnecessarily obscure the present invention. It should be noted that the term "fluid" is used herein to broadly describe both liquids and/or gasses.

Figure 1:
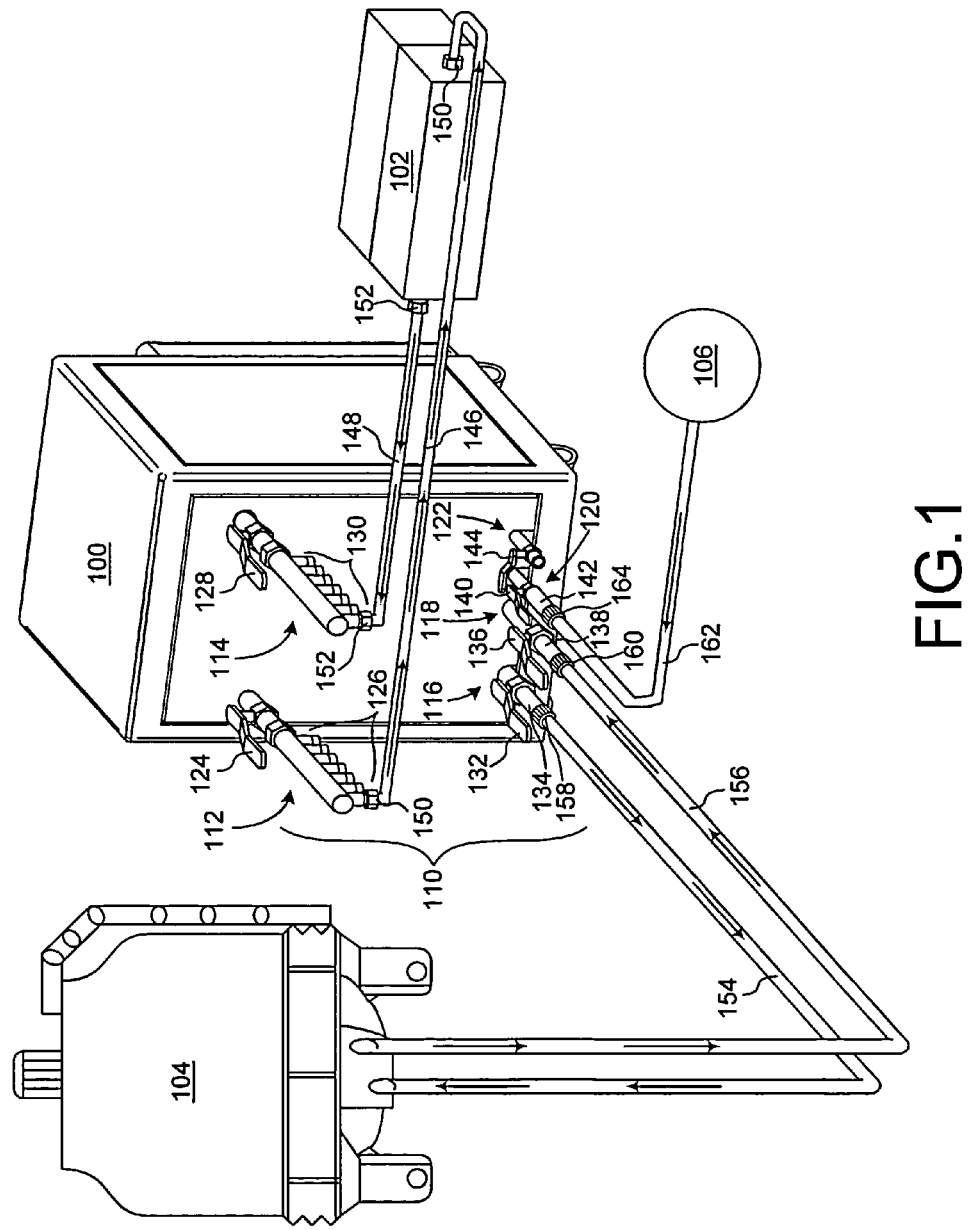
FIG. 1 shows a rear perspective view of a mold-temperature control unit 100, a mold 102, a remote fluid source 104, and an air pressure source 106.

FIG. 1 shows a perspective view of a portable mold-temperature control unit 100 coupled to a mold 102, a remote fluid source 104, and an air pressure source 106. Mold-temperature control unit 100 is a portable device operative to rapidly change the temperature of mold 102 during various steps of a molding process. In this particular embodiment, unit 100 adds and removes heat from mold 102 by pumping hot and cool water, respectively, through a channel 108 (not visible) formed through mold 102. Fluid source 104 is, for example, a remote cooling tower operative to supply cool water to unit 100. Air pressure source 106 is, for example, an air compressor line that supplies compressed air to unit 100. The compressed air enables the hot water to remain in a liquid state when heated above normal atmospheric vaporization temperatures. It should be noted that air pressure source 106 is only shown to provide a better understanding of the present and can, therefore, be substituted by an alternative compressed air source or omitted altogether. For example, unit 100 could include a local air compressor as a means to supply compressed air.

Unit 100 includes an external fluid exchange system 110 that facilitates the exchange of fluid into and out of unit 100. Fluid exchange system 110 includes a first fluid outlet 112, a first fluid inlet 114, a second fluid outlet 116, a second fluid inlet 118, an air inlet 120, and a drain 122. Outlet 112 permits both hot and cold water to flow out of unit 100 to mold 102 while inlet 114 permits the water to flow back into unit 100 after it has passed through mold 102. Outlet 112 further includes a shutoff valve 124 and a plurality of parallel outlet ports 126. Shutoff valve 124 enables a user to manually open and close outlet 112. Each of outlet ports 126 is adapted to receive a fluid line connector. Inlet 114 also includes a shutoff valve 128 and a plurality of parallel inlet ports 130. Shutoff valve 128 enables a user to manually open and close inlet 114. Each of inlet ports 130 is adapted to receive a fluid line connector. Outlet 116 facilitates the flow of water from unit 100 to fluid source 104 while inlet 118 is operative to receive cooler water from fluid source 104. Outlet 116 further includes a shutoff valve 132 and an outlet port 134. Shutoff valve 132 enables a user to manually open and close outlet 116. Outlet port 134 is adapted to receive a fluid line connector. Inlet 118 includes a shutoff valve 136 and an inlet port 138. Shutoff valve 136 enables a user to manually open and close inlet 118. Inlet port 138 is adapted to receive a fluid line connector. Air inlet 120 is adapted to receive compressed air and includes a shutoff valve 140 and an inlet port 142. Shutoff valve 140 enables a user to manually open and close air inlet 120. Inlet port 142 is adapted to receive a compressed-air hose connector. Drain 122 includes a shutoff valve 144 that, when opened, allows water to drain out of unit 100.

In this particular embodiment, unit 100 is shown connected to mold 102, fluid source 104, and air pressure source 106. In particular, outlet 112 and inlet 114 are connected to mold 102 via a set of fluid lines 146 and 148, respectively. Each end of fluid line 146 includes a connector 150, one of which is connected to one of seven outlet ports 126 of outlet 112, the other being connected to a fluid inlet of mold 102. Likewise, each end of fluid line 148 includes a connector 152, one of which is connected to one of seven inlet ports 130 of inlet 114, the other being connected to a fluid outlet (also not shown) of mold 102. Outlet 116 and inlet 118 are connected to fluid source 104 via a set of fluid lines 154 and 156, respectively. Fluid line 154 includes a connector 158 connected to outlet port 116. Fluid line 156 includes a connector 160 fixed directly to inlet port 138 of inlet 118. Inlet 120 is connected to air pressure source 106 via an air hose 162 that also includes a connector 164 connected to inlet port 142. Each of fluid lines 146, 148, 154, and 156 is, for example, a water hose. Each of connectors 150, 152, 158, 160, and 164 is, for example, a quick connect/disconnect device.

As will be explained in greater detail below, unit 100 is operative to control the temperature of mold 102 during injection molding processes. In particular, unit 100 rapidly heats and cools mold 102 during each injection cycle.

Figure 2:
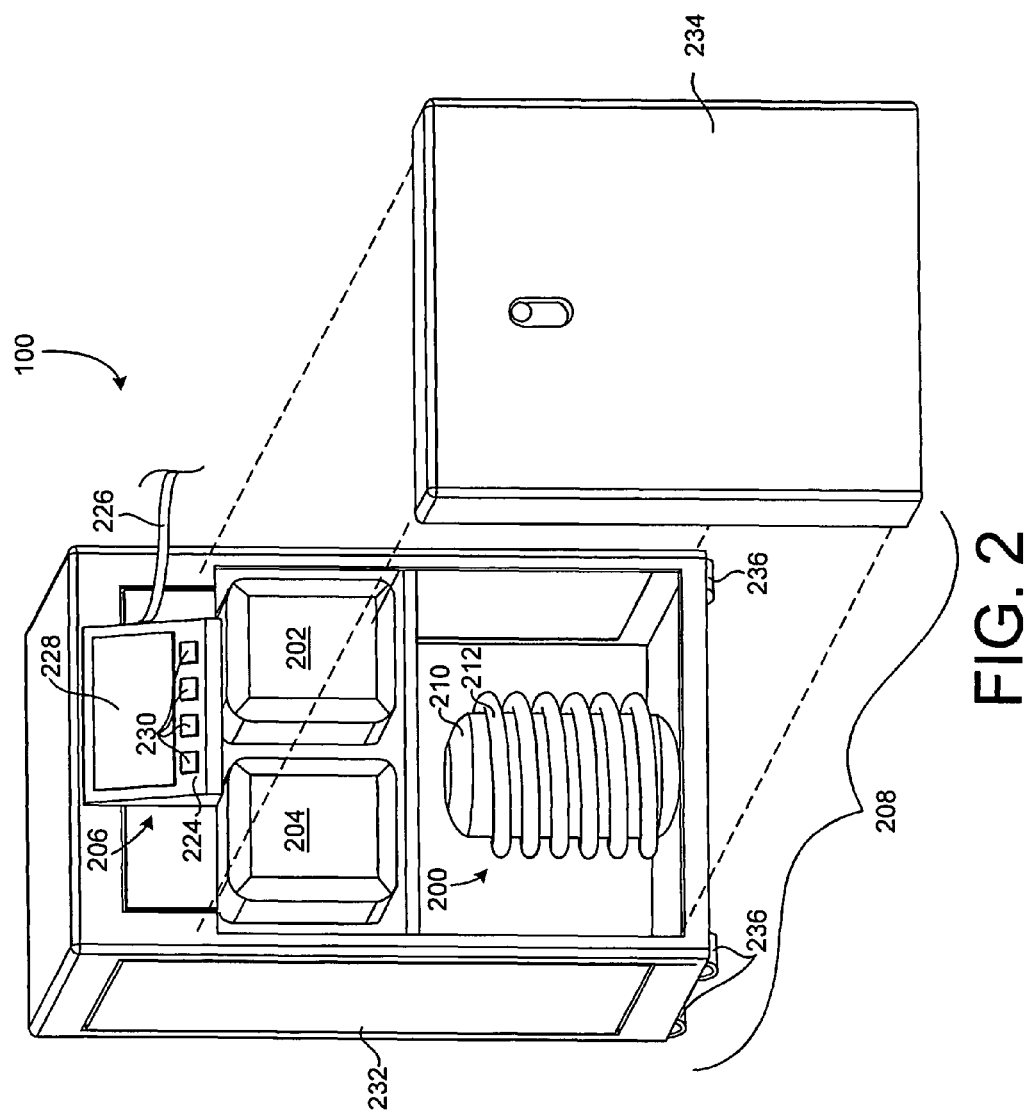
FIG. 2 shows a front perspective view of the mold-temperature control unit 100 of FIG. 1.
Figure 3:
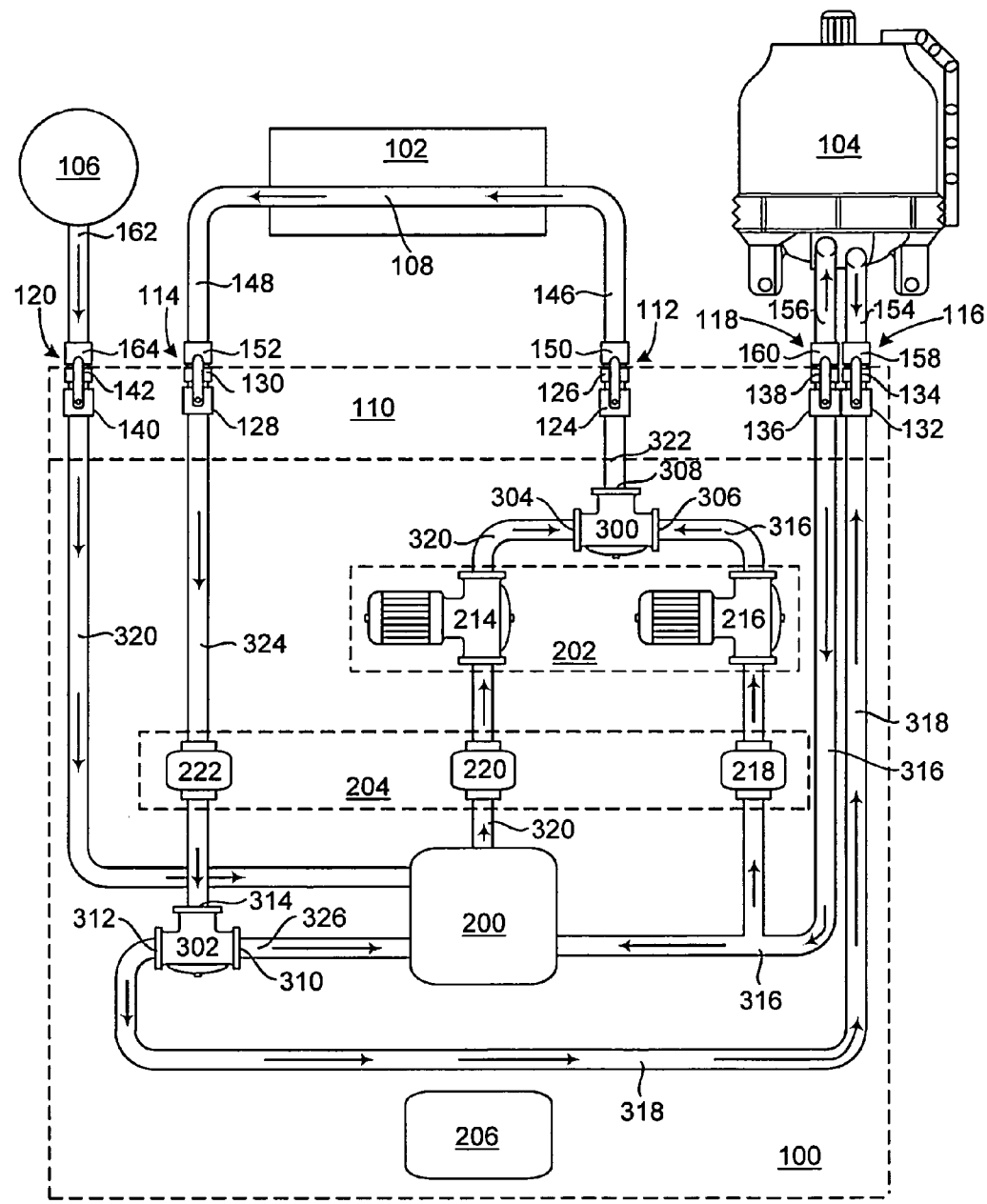
FIG. 3 is a schematic diagram depicting fluid flow of between mold-temperature control unit 100, mold 102, remote fluid source 104, and air pressure source 106 of FIG. 1.

FIG. 2 shows a perspective front-view of mold-temperature control unit 100 further including a local heating system 200, local pump system 202, a local filter system 204, a local control system 206, and a support structure 208. Heating system 200 includes a hot-fluid reservoir 210 and a heating element 212. Reservoir 210 is, for example, a hot-water tank adapted to contain water heated by heating element 212. Heating element 212 is, for example, an electric coil heater that is thermally coupled around the outside of reservoir 210 so as to heat water contained by reservoir 210 under pressure. Pump system 202 is, for example, a multi-function system that circulates both hot and cold water throughout unit 100 via a hot-water pump 214 (not shown) and a cold-water pump 216 (also not shown). Filter system 204 is operative to filter water as it circulates throughout unit 100 via a set of filters 218, 220, and 222 (FIG. 3). Control system 206 is, for example, an on-board computer system operative to control various operations of unit 100, as will be described in greater detail below. Further, control system 206 includes a user input/output panel 224 and a communication line 226. User input/output panel 224 facilitates user interaction via a display screen 228 and a set of buttons 230. Communication line 226 allows control system 206 to communicate with remote devices such as, for example, molding machines, mold-temperature sensors, etc. Support structure 208 includes a housing 232, an access panel 234, and a set of wheels 236. Housing 232 is an enclosure operative to protect and support the various components of unit 100. Access panel 234 is a removable door that provides user access to the various components enclosed by housing 232. Wheels 236 are mounted to the bottom of unit 100 so as to provide mobility to unit 100. Wheels 236 are only one example of a transport device, which provides a means of easily transporting unit 100. It should be noted that power can be supplied to unit 100 by any suitable means. For example, unit 100 could have a power outlet and/or a local battery system.

It is important to recognize that unit 100 does not rely on a remote hot-fluid source (e.g., boiler) as a means to heat mold 102, because heat is generated on-board via heating system 200. Therefore, unit 100 can operate in facilities that do not have a central hot fluid supply. Also, unit 100 can operate while being disconnected from all remote fluid sources, because unit 100 can recycle its own fluid on-board, as will be described with reference to subsequent figures.

FIG. 3 is a diagram illustrating additional features of unit 100 not visible in previous figures. Additionally, fluid exchange between unit 100, mold 102, fluid source 104, and air pressure source 106 is also described.

Unit 100 includes a set of T-valves 300 and 302 for regulating flow through various fluid ducts. T-valves 300 and 302 are, for example, electromechanical valves that operate in either a first position or a second position. T-valve 300 includes a first inlet 304, a second inlet 306, and an outlet 308. In the first position, inlet 306 is closed and inlet 304 is open such that only fluid supplied to inlet 304 is permitted to flow out of outlet 308. Conversely, in the second position, inlet 304 is closed and inlet 306 is open such that only fluid supplied to inlet 306 will flow out of outlet 308. Similarly, T-valve 302 includes a first outlet 310, a second outlet 312, and an inlet 314. In the first position, outlet 312 is closed and outlet 310 is open such that only fluid supplied to inlet 314 will be permitted to flow out of outlet 310. In the second position, outlet 310 is closed and outlet 312 is open such that only fluid supplied to inlet 314 will be directed out of outlet 310.

The various components of unit 100 are assembled into a fluid network via a plurality of fluid ducts 316, 318, 320, 322, 324, 326, and 328. Duct 316 guides cool water from inlet 118 of unit 100 to both heating system 200 and inlet 306 of T-valve 300. Duct 318 guides water from outlet 312 of T-valve 302 to outlet 116 of unit 100. Duct 320 guides hot water from heating system 200 to inlet 304 of T-valve 300. Duct 322 guides water from outlet 308 of T-valve 300 to outlet 112 of unit 100. Duct 324 guides water from inlet 114 of unit 100 to inlet 314 of T-valve 302. Duct 326 guides water from outlet 310 of T-valve 302 to heating system 200. Finally, duct 328 provides heating system 200 with pressurized air from inlet 120 of unit 100. Heating system 200 uses the pressurized air to prevent the water from vaporizing when heated to temperatures well above the normal atmospheric boiling temperature of water.

During the rapid heating of mold 102, T-valves 300 and 302 operate in the first position, pump 214 is powered on, and pump 216 is powered off. As a result, hot water flows out of heating system 200 along duct 320 passing through filter 220 and pump 214. Flow continues into inlet 304 then out of outlet 308 of T-valve 300. The flow continues along duct 322 passing through outlet 112 and into fluid line 146. As the hot water flows through mold 102, heat from the water is transferred to mold 102. The water exits mold 102 at a lower temperature and the flow continues along fluid line 148 through inlet 114. Flow continues along duct 324 passing through filter 222 and into inlet 314 of T-valve 302. Finally, the water flows out of outlet 310, then through duct 326, and back into heating system 200 where it is heated and used again. Optionally, T-valve 302 could be operating in the second position wherein the water flows out of outlet 312, along duct 318, and eventually into fluid source 104 (e.g., a cooling tower).

During the rapid cooling of mold 102, T-valves 300 and 302 operate in the second position, pump 214 is powered off, and pump 216 is powered on. As a result, cool water flows out from fluid source 104 along fluid line 156 and through inlet 118. The flow continues along duct 316 passing through filter 218 and cool-water pump 216. The cool water then flows into inlet 306 and out of outlet 308 of T-valve 300. The flow continues along duct 322 passing through outlet 112 and into fluid line 146. As the cool water flows through mold 102, heat from mold 102 is transferred into the water. The water exits mold 102 at a higher temperature and the flow continues along fluid line 148 through inlet 114. Flow continues along duct 324 passing through filter 222 and into inlet 314 of T-valve 302. The water continues to flow out of outlet 312 along duct 318 and through outlet 116. Finally, the water flows through fluid line 154 and back into fluid source 104 where it is cooled.

Figure 4A:
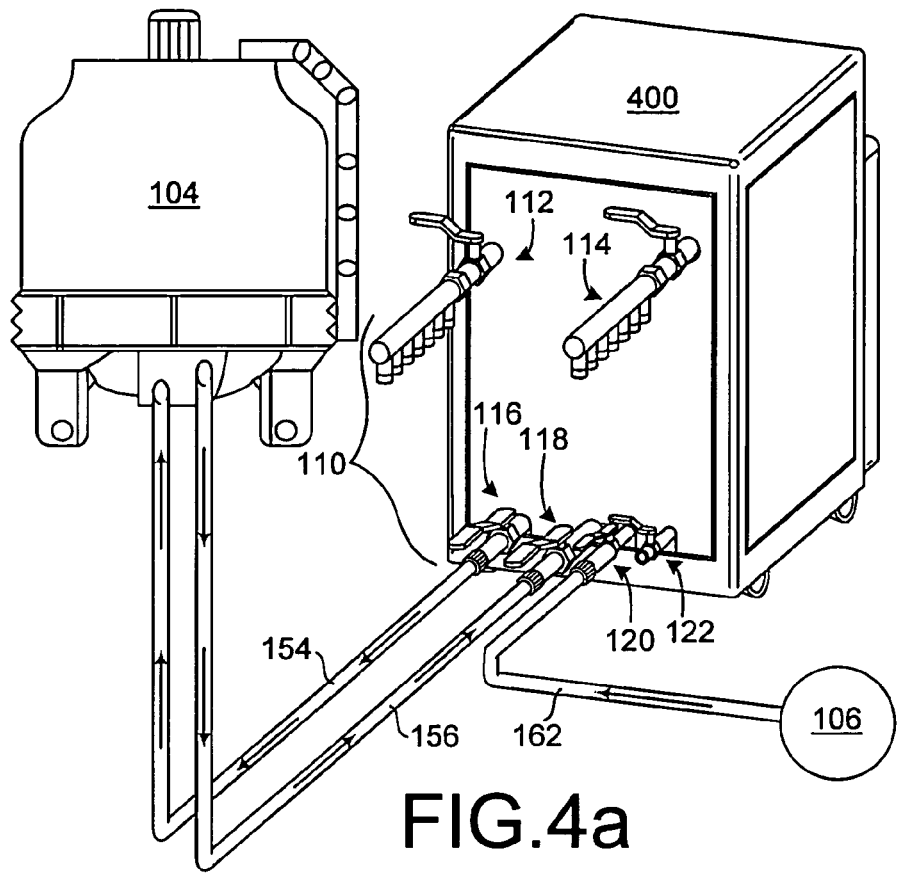
FIG. 4a shows a perspective view of an alternative mold-temperature control unit 400, remote fluid source 104 and air pressure source 106.
Figure 4B:
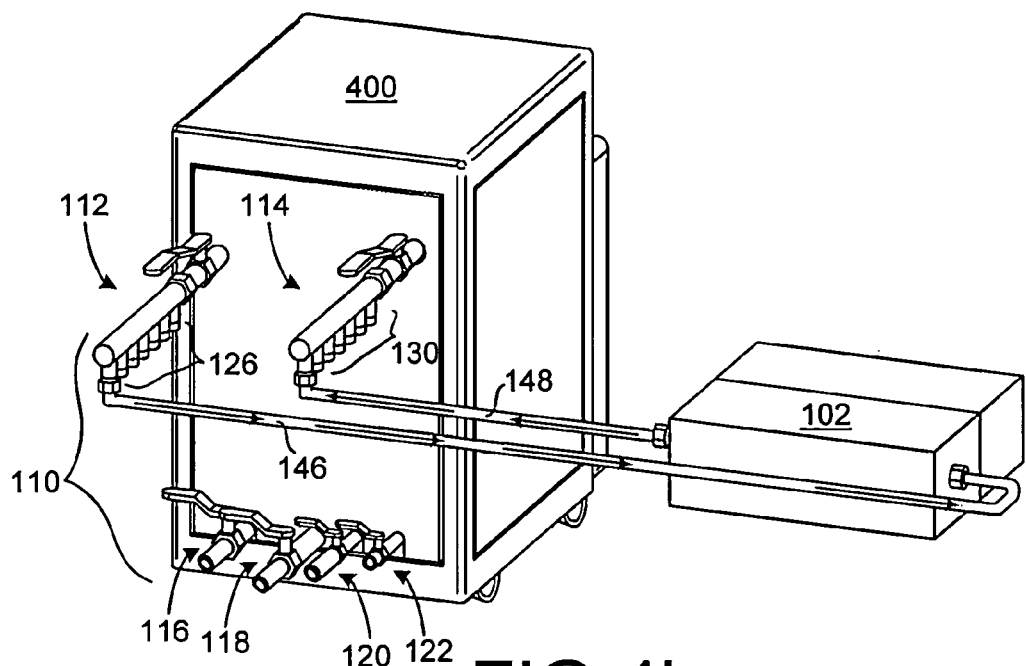
FIG. 4b shows a perspective view of mold-temperature control unit 400 and mold 102.

FIGS. 4a and 4b show an alternative mold-temperature control unit 400 according to another embodiment of the present invention. In this particular embodiment, fluid exchange between fluid source 104 and air pressure source 106 is accomplished before unit 400 is transported to a molding machine and connected to a mold to control the heating and cooling process. FIG. 4a shows unit 400 during a charging state, and FIG. 4b shows unit 400 during a subsequent heating and cooling control state. In the charging state, unit 400 is connected to fluid source 104 and air pressure source 106. During charging, any dirty water left from previous applications is removed from unit 400 through outlet 116 and fresh water is supplied through inlet 118 until sufficient operating levels of clean water are achieved. In addition, unit 400 is pressurized to a sufficient operating pressure with compressed air through inlet 120.

Once charged, unit 400 is disconnected from fluid source 104 and air pressure source 106. Then, unit 400 is transported and connected to mold 102 and operates in the heating and cooling control state as shown FIG. 4b. Although unit 400 is shown to have the capability of operating while disconnected from a fluid source, it can also operate while connected.

Figure 5:
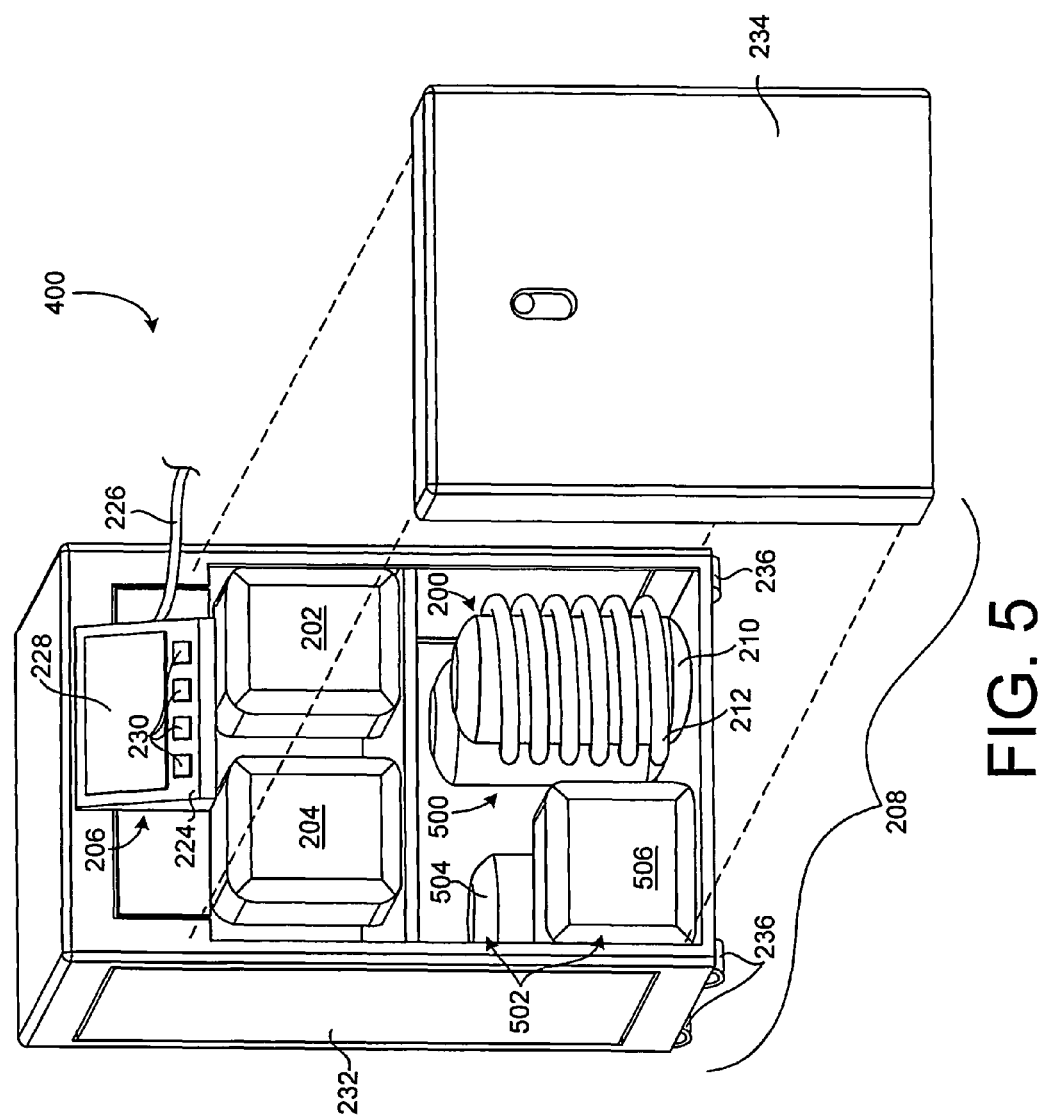
FIG. 5 shows a front perspective view of mold-temperature control unit 400.

FIG. 5 shows a perspective view of unit 400 including a steam generator 500, a local cooling system 502, local heating system 200, local pump system 202, local filter system 204, local control system 206, and support structure 208. Steam generator 500 is an on-board device operative to convert hot water from heating system 200 into steam that can be used to heat mold 102. As described above, heating system 200 provides hot water under pressure. Cooling system 502 is an on-board cooling system operative to chill water that is used to cool mold 102. Cooling system 502 includes a cool-water reservoir 504 and a refrigeration system 506. Cool-water reservoir 504 holds water while refrigeration system 506 removes heat from the water.

Unit 400 provides several advantages over conventional heating and cooling systems. For example, unit 400 can operate in environments that do not provide a remote fluid source (e.g., boiler, cooling tower, etc.). In such a case, unit 100 operates as a fully self-contained closed loop system, wherein the fluid used for heating and cooling is recycled and used repeatedly. Optionally, unit 400 can operate as an open loop system in environments that do provide remote fluid sources. As another advantage, unit 400 has a very large heating and cooling temperature range which makes it suitable for use in a variety of different applications. Depending on the particular application, unit 400 can use either hot liquid water from heating system 200 or steam from steam generator 500 as a heating medium. In many applications, hot water under pressure can provide the advantages of steam assisted systems, but realize significant energy savings and portability. Additionally, unit 400 can use either chilled water from cooling system 502 or cool water from a remote source as a cooling medium.

Figure 6:
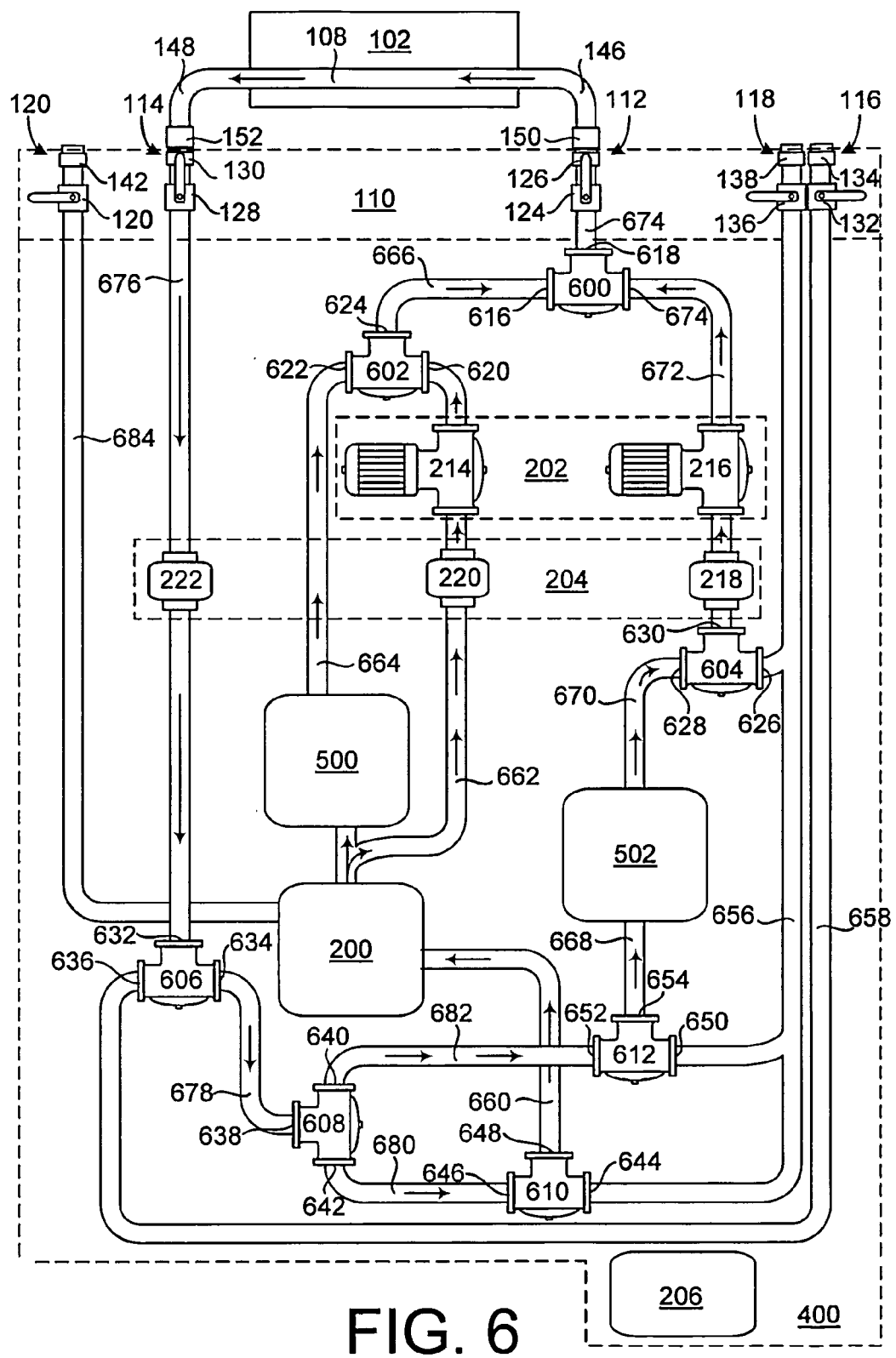
FIG. 6 is a schematic diagram depicting fluid flow of the mold-temperature control unit 400 and mold 102 of FIG. 4b.

FIG. 6 is a diagram depicting unit 400 operating as a closed loop system, wherein unit 400 is connected to mold 102 and disconnected from all external fluid sources. Fluid flow within unit 400 is regulated by a set of electromechanical T-valves 600, 602, 604, 606, 608, 610, and 612, each of which operate in either a first position or a second position. T-valve 600 includes a first inlet 614, a second inlet 616, and an outlet 618. In the first position, inlet 614 is closed and inlet 616 is open such that only fluid supplied to inlet 616 will flow out of outlet 618. Oppositely, in the second position, inlet 616 is closed and inlet 614 is open. T-valve 602 includes a first inlet 620, a second inlet 622, and an outlet 624. In the first position, inlet 620 is closed and inlet 622 is open. In the second position, inlet 620 is open and inlet 622 is closed. T-valve 604 includes a first inlet 626, a second inlet 628, and an outlet 630. In the first position, inlet 626 is closed and inlet 628 is open. In the second position, inlet 626 is open and inlet 628 is closed. T-valve 606 includes an inlet 632, a first outlet 634, and a second outlet 636. In the first position, outlet 634 is closed and outlet 636 is open. In the second position, outlet 634 is open and outlet 636 is closed. T-valve 608 includes a inlet 638, a first outlet 640, and a second outlet 642. In the first position, outlet 640 is closed and outlet 642 is open. In the second position, outlet 640 is open and outlet 642 is closed. T-valve 610 includes a first inlet 644, a second inlet 646, and an outlet 648. In the first position, inlet 644 is closed and inlet 646 is open. In the second position, inlet 644 is open and inlet 646 is closed. Finally, T-valve 612 includes a first inlet 650, a second inlet 652, and an outlet 654. In the first position, inlet 650 is closed and inlet 652 is open. In the second position, inlet 650 is open and inlet 652 is closed.

The various components of unit 400 are assembled into a fluid network via a plurality of fluid ducts 656, 658, 660, 662, 664, 666, 668, 670, 672, 674, 676, 678, 680, 682, and 684. Duct 656 guides water from inlet 118 to inlet 626 of T-valve 604, inlet 650 of T-valve 612, and inlet 644 of T-valve 612. Duct 658 guides water from outlet 636 to outlet 116 of unit 400. Duct 660 guides water from outlet 648 of T-valve 610 to heating system 200. Duct 662 guides hot water from heating system 200 to both steam generator 500 and inlet 616 of T-valve 600. Duct 664 guides from steam generator 500 to inlet 622 of T-valve 602. Duct 666 guides either hot water or steam from outlet 624 of T-valve 602 to inlet 616 of T-valve 600. Duct 668 guides water from outlet 654 into cooling system 502. Duct 670 guides chilled water from cooling system 502 to inlet 628 of T-valve 604. Duct 672 guides water from outlet 630 of T-valve 604 to inlet 614 of T-valve 600. Duct 674 guides water from outlet 618 of T-valve 600 to outlet 112 of unit 400. Duct 676 guides water from inlet 114 of unit 400 to inlet 632 of T-valve 606. Duct 678 guides water from outlet 634 of T-valve 606 to inlet 638 of T-valve 608. Duct 680 guides water from outlet 642 of T-valve 608 to inlet 646 of T-valve 610. Duct 682 guides water from outlet 640 to inlet 652 of T-valve 612. Duct 684 is an air pressure line that connects heating system 200 to inlet 120.

The following example describes the heating of mold 102 via hot water when unit 400 operates as a closed loop system. T-valves 600, 604, 608, 610, and 612 operate in the first position, T-valves 602 and 606 operate in the second position, pump 214 powers on, and pump 216 powers off. As a result, hot water flows out of heating system 200 along duct 662 passing through filter 220 and pump 214. Flow continues into inlet 620 then out of outlet 624 of T-valve 600. The flow continues along duct 674 passing through outlet 112 and into fluid line 146. As the hot water flows through mold 102, heat from the water is transferred to mold 102. The water exits mold 102 at a lower temperature and the flow continues along fluid line 148 through inlet 114. Flow continues along duct 676 passing through filter 222 and into inlet 632 of T-valve 606. After exiting T-valve 606 through outlet 634, the flow continues along duct 678 and enters inlet 638 of T-valve 608. The flow exits outlet 642 and continues along duct 680 into inlet 646 of T-valve 610. Finally, the water exits T-valve 610 through outlet 648, then continues along duct 660 and back into heating system 200 where it is heated and used again. Optionally, unit 400 could heat mold via steam rather than hot water. If steam is used, T-valve 602 operates in the first position and pump 214 is off while the rest of the components operate the same as if hot water is used. With T-valve 602 operating in the first position, steam passes through T-valve 602 instead of hot water.

The following example describes the cooling of mold 102 via chilled water when unit 400 operates as a closed loop system. T-valves 602, 604, 606, 610, and 612 operate in the first position, T-valves 600 and 608 operate in the second position, pump 214 is powered off, and pump 216 is powered on. As a result, cool water flows out from cooling system 502 along duct 670 and into inlet 628. The flow exits T-valve 604 through outlet 630 and continues along duct 672 passing through filter 218 and cool water pump 216. The cool water then flows into inlet 614 and out of outlet 618 of T-valve 600. The flow continues along duct 674 passing through outlet 112 and into fluid line 146. As the cool water flows through mold 102, heat from mold 102 is transferred into the water. The water exits mold 102 at a higher temperature and the flow continues along fluid line 148 through inlet 114. Flow continues along duct 676 passing through filter 222 and into inlet 632 of T-valve 606. The water continues out of outlet 634 along duct 678 and into inlet 638 of T-valve 608. The water exits T-valve 608 through outlet 640 and continues along duct 682 and into inlet 652 of T-valve 612. Finally, the water exits T-valve 612 through outlet 654 then continues along duct 668 where it is returned to cooling system 502. The water is then chilled and used again.

It should be recognized that unit 400 can also operate as an open loop cooling system wherein cooling system 502 is bypassed and fluid from a remote fluid source is used to cool mold 102. For example, T-valve 606 operates in the first position, T-valves 600, 602, 604, 608, 610, and 612 operate in the second position, pump 214 is powered off, and pump 216 is powered on. As a result, cool water from a remote cooling source flows through inlet 114 along duct 656 and into inlet 626. The flow exits T-valve 604 through outlet 630 and continues along duct 672 passing through filter 218 and cool water pump 216. The cool water then flows into inlet 614 and out of outlet 618 of T-valve 600. The flow continues along duct 674 passing through outlet 112 and into fluid line 146. As the cool water flows through mold 102, heat from mold 102 is transferred into the water. The water exits mold 102 at a higher temperature and the flow continues along fluid line 148 through inlet 114. Flow continues along duct 676 passing through filter 222 and into inlet 632 of T-valve 606. The water continues out of outlet 636 along duct 658 then exits unit 400 through outlet 116.

Figure 7:
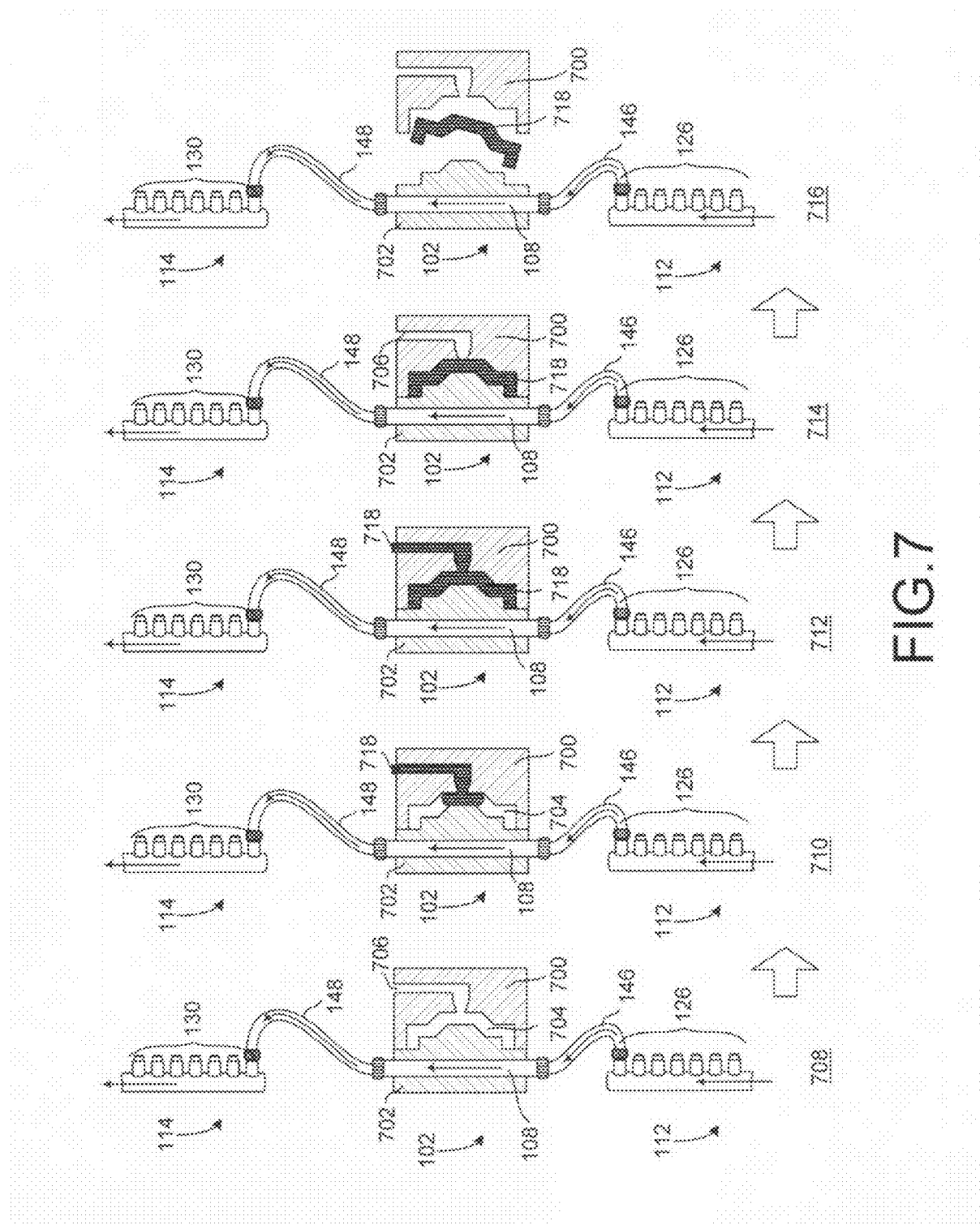
FIG. 7 is a diagram illustrating rapid heating and cooling of mold 102 during a molding process.

FIG. 7 is a diagram illustrating the rapid heating and cooling of mold 102 by either of units 100 and 400 during various stages of an example molding cycle. Additionally, example features of mold 102 are shown to provide a better understanding of the present invention. That is, mold 102 includes a cavity side 700 and a core side 702 that, together, define a cavity 704. Cavity side 700 includes a channel 706 (e.g., sprue) that facilitates the flow of molten plastic into cavity 704. Core side 702 includes channel 108 which, as previously mentioned, facilitates the flow of both hot and cool fluid through mold 102. Those skilled in the art will recognize that specific design details of mold 102 will vary depending on the particular application and are, therefore, not an essential aspect of the present invention.

The example molding cycle includes a clamping stage 708, an injection stage 710, a setting stage 712, a cooling stage 714, and a removal stage 716. In the clamping stage 708, cavity side 700 and core side 702 are clamped shut while hot fluid is pumped from outlet 112, through channel 108, and into inlet 114. The hot fluid continues to flow while the temperature of mold 102 approaches a predetermined injection temperature. Once the temperature is reached, the injection stage 710 begins and a shot of molten plastic 718 is injected into cavity 704 through channel 706. Then, with the hot fluid still flowing, the process enters the setting stage 712 wherein the plastic is held under pressure until a predetermined setting temperature is reached. Immediately after the setting temperature is reached, the process enters the cooling stage 714 wherein the hot fluid stops flowing and cool water begins flowing along the same flow path. As the cool fluid continues to flow, the temperature of mold 102 rapidly decreases until plastic 718 is rigid enough for removal. As the process enters the removal stage 716, the cool fluid stops flowing and the hot fluid begins flowing in preparation for the clamping stage of a subsequent molding cycle. At this time, cavity side 700 and core side 702 separate while plastic 718 is removed by some suitable means. Then, with hot fluid still flowing through channel 108, clamping stage 708 begins again and the cycle continues.

Units 100 and 400 are capable of rapidly heating and cooling mold 102 during each molding cycle. Using hot water under pressure, mold 102 can be heated to a temperature of between 100° C. and 150° C., with 130° C. typically providing good results. In addition, using cold water, mold 102 can be cooled to a temperature in the range of 30° C. to 85° C., with 70° C. typically providing good results. The rapid heating and cooling provided by units 100 and 400 facilitate very short molding cycle times. Depending on the particular molding process, cycle times as short as 15 seconds to 10 minutes can be achieved. Superior high-gloss molded parts can be obtained with cycle times ranging from 15 seconds to one minute. In addition to providing superior part quality, the rapid cycle times provide a significant increase in part yield.

In addition, units 100 and 400 provide an advantage in that they are programmable and are capable of interfacing with the molding machine. Once a particular program is established for a particular molding process, the units can provide heating and cooling to a mold and control signals to the molding machine, based on the program and feedback from the mold and/or molding machine. This provides very accurate and repeatable thermal cycles for a molding process.

Figure 8:
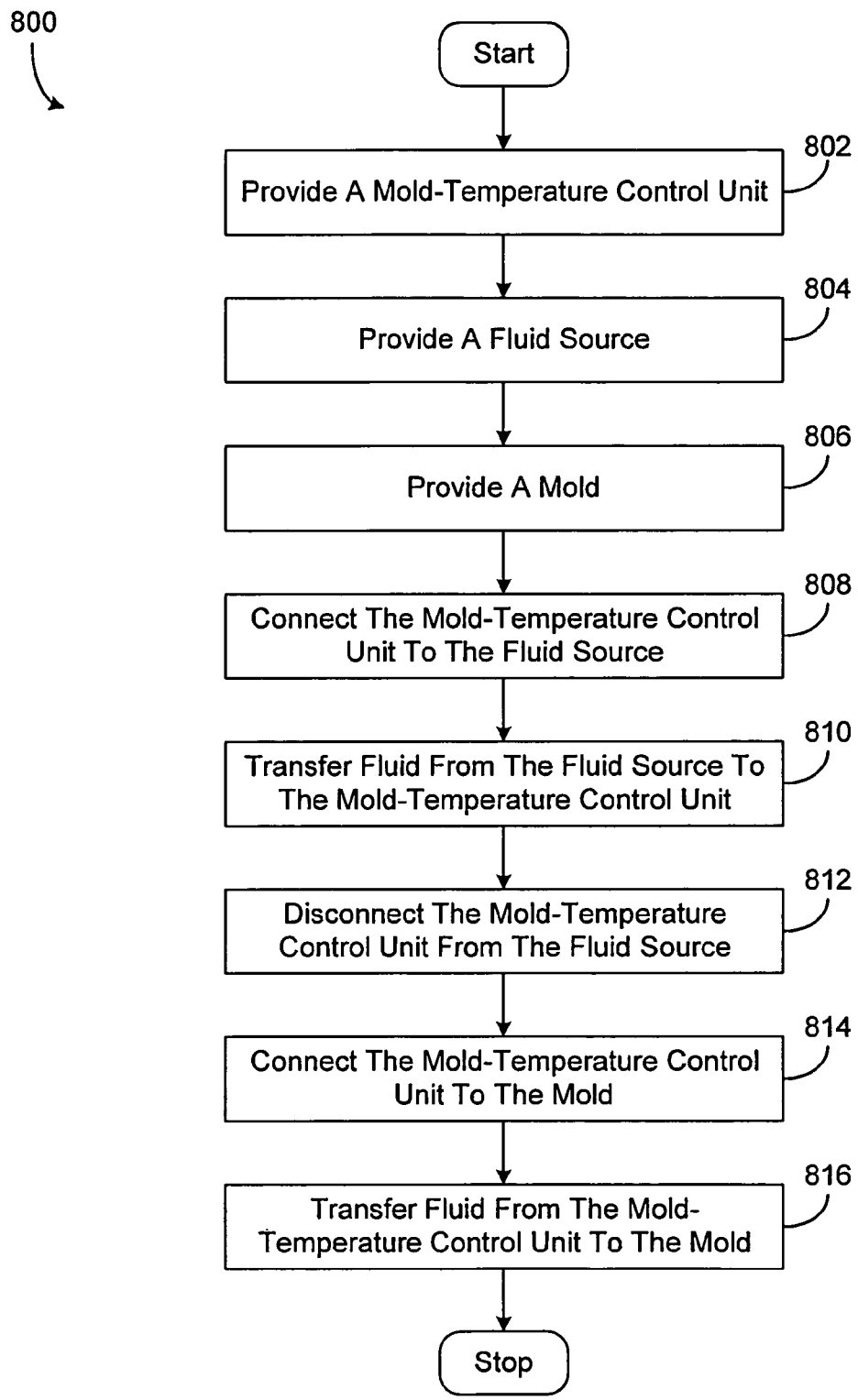
FIG. 8 is a flow-chart 800 describing a method for using mold-temperature control unit 400.

FIG. 8 is a flow chart summarizing a method 800 for using a mold-temperature control unit. In a first step 802, a mold-temperature control unit is provided. Next, in a second step 804, a fluid source is provided. Then, in a third step 806, a mold is provided. Next, in a fourth step 808, the mold-temperature unit is connected to the fluid source. Then, in a fifth step 810, fluid is transferred from the fluid source to the mold-temperature control unit. Next, in a sixth step 812, the mold-temperature control unit is disconnected from the fluid source. Then, in a seventh step 814, the mold-temperature control unit is connected to the mold. Finally, in an eighth step 816, fluid is transferred from the mold-temperature control unit to the mold. Circulation of the fluid through the mold rapidly heats and cools the mold during the molding process.

The description of particular embodiments of the present invention is now complete. Many of the described features may be substituted, altered or omitted without departing from the scope of the invention. For example, alternate heat transfer mediums (e.g., oil), may be used in place of water. As another example, alternate valves and/or valve systems may be substituted for the T-valves and shutoff valves. As yet another example, alternate transport devices may be substituted for the wheels shown, including but not limited to fork lift receiving tubes, lifting shackles, tracks, sprockets, and so on. These and other deviations from the particular embodiments shown will be apparent to those skilled in the art, particularly in view of the foregoing disclosure.

We claim:

1. A portable mold-temperature control unit comprising:
a support structure;
a transport mechanism coupled to said support structure;
a heating system coupled to said support structure for heating fluid used to heat a mold;
a cooling system coupled to said support structure;
a first fluid duct coupled to said support structure for facilitating the flow of hot fluid heated by said heating system;
a second fluid duct coupled to said support structure for facilitating the flow of cool fluid used to cool said mold, said cool fluid cooled by said cooling system; and
a fluid exchange system coupled to said support structure and operative to supply hot fluid from said first fluid duct to said mold and cool fluid from said second fluid duct to said mold, said fluid exchange system being further operative to receive said fluid from said mold; and wherein
said heating system includes a steam generator operative to generate steam used to heat said mold; and
said first duct facilitates the flow of steam generated by said steam generator.

2. A portable mold-temperature control unit according to claim 1, wherein said cooling system includes a refrigeration system and a cool-fluid reservoir, said refrigeration system being operative to cool fluid, said cool-fluid reservoir being operative to hold said fluid cooled by said refrigeration system.

3. A portable mold-temperature control unit according to claim 1, wherein
said fluid exchange system includes an inlet for receiving fluid from a remote fluid source, and
said cooling system is operative to cool fluid received via said inlet.

4. A portable mold-temperature control unit according to claim 1, wherein said cooling system is operative to cool fluid received by said fluid exchange system from said mold.

5. A portable mold-temperature control unit according to claim 1, wherein
said heating system further includes a heater operative to heat liquid used to heat said mold;
said portable mold-temperature control unit further includes a third duct that facilitates the flow of liquid heated by said heater; and
said fluid exchange system is further operative to supply hot fluid from said third fluid duct to said mold.

6. A portable mold-temperature control unit according to claim 5, wherein said fluid exchange system includes
a mold supply outlet operative to supply fluid from said first fluid duct, said second fluid duct, and said third fluid duct to said mold, and
a return inlet operative to receive fluid previously supplied to said mold via said mold supply outlet.

7. A portable mold-temperature control unit according to claim 6, further including a valve capable of operating in a first position and a second position, said valve including:
a first inlet port coupled to receive hot fluid from at least one of said first fluid duct and said third fluid duct;
a second inlet port coupled to receive cool fluid from said second duct; and
an outlet port coupled to supply fluid to said mold supply outlet; and
wherein said first inlet port of said valve is opened and said second inlet port of said valve is closed when said valve operates in said first position; and
wherein said first inlet port of said valve is closed and said second inlet port of said valve is opened when said valve operates in said second position.

8. A portable mold-temperature control unit according to claim 7, wherein:
said fluid exchange system includes a reservoir outlet for discharging fluid from said mold-temperature control unit to a remote fluid reservoir;
said mold-temperature control unit further includes a second valve capable of operating in a first position and a second position, said second valve including
a first inlet port coupled to receive fluid from said return inlet,
a first outlet port coupled to at least one of said cooling system and said heating system, and
a second outlet port coupled to supply fluid to said reservoir outlet; and
wherein said first outlet port of said second valve is opened and said second outlet port of said second valve is closed when said second valve operates in said first position; and
wherein said first outlet port of said second valve is closed and said second outlet port of said second valve is opened when said second valve operates in said second position.

9. A portable mold-temperature control unit according to claim 1, wherein said fluid exchange system includes:
an outlet operative to supply fluid from said first fluid duct and said second fluid duct to a mold;
an inlet operative to receive fluid returning from a mold, said fluid returning from said mold being supplied to said mold by said outlet;
a second outlet operative to discharge fluid out of said mold-temperature control unit; and
a second inlet operative to receive fluid from a remote fluid source.

10. A portable mold-temperature control unit according to claim 9, further including a valve capable of operating in a first position and a second position, said valve including
a first inlet port coupled to receive hot fluid from said first fluid duct,
a second inlet port coupled to receive cool fluid from said second fluid duct, and
an outlet port coupled to supply fluid to said outlet; and
wherein said first inlet port is opened and said second inlet is closed when said valve operates in said first position; and
wherein said first inlet port is closed and said second inlet port is opened when said valve operates in said second position.

11. A portable mold-temperature control unit according to claim 9, further comprising
a valve capable of operating in a first position and a second position, said valve including
a first inlet port coupled to receive fluid from said inlet,
a first outlet port coupled to at least one of said cooling system and said heating system, and
a second outlet port operative to supply fluid to said second outlet; and
wherein said first outlet port is opened and said second outlet port is closed when said valve operates in said first position; and wherein said first outlet port is closed and said second outlet port is opened when said valve operates in said second position.

12. A portable mold-temperature control unit according to claim 9, wherein said outlet of said fluid exchange system includes at least one outlet port coupled to permit fluid from both said first fluid duct and said second fluid duct to flow therethrough.

13. A portable mold-temperature control unit according to claim 9, wherein said inlet of said fluid exchange system includes at least one inlet port for receiving fluid supplied to said mold by both said first fluid duct and said second fluid duct.

14. A portable mold-temperature control unit according to claim 1, wherein said heating system is a local heating system and said steam generator is a local steam generator.

15. A portable mold-temperature control unit according to claim 14, wherein said local heating system further includes a reservoir operative to contain hot water, said reservoir being further operative to supply hot water to said local steam generator.

16. A portable mold-temperature control unit according to claim 1, wherein
said heating system further includes a heater operative to heat liquid used to heat said mold, and
said first duct further facilitates the flow of liquid heated by said heater.

17. A portable mold-temperature control unit according to claim 16, wherein
said fluid exchange system includes an inlet adapted to receive water from a remote water source, and
said local heating system is operative to heat water received via said inlet and use said heated water to heat said mold.

18. A portable mold-temperature control unit according to claim 16, wherein said heating system is operative to heat fluid received by said fluid exchange system from said mold.

19. A portable mold-temperature control unit according to claim 16, further including an air compressor coupled to said support structure for providing pressurized air to maintain said heated liquid under pressure.

20. A portable mold-temperature control unit according to claim 16, further including an air inlet adapted to receive pressurized air from a remote source, said pressurized air maintaining said heated liquid under pressure.

21. A portable mold-temperature control unit according to claim 1, further comprising a pump system coupled to said support structure.

22. A portable mold-temperature control unit according to claim 21, wherein said pump system includes a hot-fluid pump and a cool-fluid pump, said hot-fluid pump being operative to transport fluid through said first fluid duct when actuated, said cool-fluid pump being operative to transport fluid through said second fluid duct when actuated.

23. A portable mold-temperature control unit according to claim 1, further comprising a filter system.

24. A portable mold-temperature control unit according to claim 1, further comprising a control system coupled to said support structure.

25. A portable mold-temperature control unit according to claim 24, wherein said control system includes a user input/output device.

26. A portable mold-temperature control unit according to claim 24, wherein said control system includes an interface for communicating with a mold machine.

27. A portable mold-temperature control unit according to claim 24, further including a set of electromechanical valves coupled to receive control signals provided by said control system and operative to selectively provide said hot fluid and said cool fluid to said mold based on said control signals.

28. A portable mold-temperature control unit according to claim 24, further including a pump system coupled to receive control signals provided by said control system and operative to selectively pump said hot fluid and said cool fluid based on said control signals.

29. A portable mold-temperature control unit according to claim 24, wherein said control system is adapted to receive an electrical signal provided by a remote mold-temperature sensor.

30. A portable mold-temperature control unit according to claim 24, wherein said control system is adapted to receive an electrical signal provided by a local temperature sensor.

31. A portable mold-temperature control unit according to claim 24, wherein said control system is adapted to receive an electrical signal provided by a local pressure sensor.

32. A portable mold-temperature control unit according to claim 1, further including:
a local heater;
a local hot-water reservoir operative to contain water heated by said heater;
a local refrigeration system;
a local cool-water reservoir operative to hold water cooled by said local refrigeration system;
a local pump system; and
a local control system electrically coupled to said local pump system; and wherein said steam generator is a local steam generator.

33. A method for controlling the temperature of a mold, said method comprising:
providing a portable mold-temperature control unit;
providing a remote fluid source;
providing a mold;
connecting said portable mold-temperature control unit to said remote fluid source;
transferring fluid from said remote fluid source to said portable mold-temperature control unit;
disconnecting said portable mold-temperature control unit from said remote fluid source;
connecting said portable mold-temperature control unit to said mold;
using said mold-temperature control unit to generate steam;
circulating said steam from said mold-temperature control unit through said mold while said portable mold-temperature control unit is disconnected from said remote fluid source; and
circulating said fluid from said mold-temperature control unit through said mold while said portable mold-temperature control unit is disconnected from said remote fluid source.

* * * * *